Oct. 3, 1950 M. S. POLLOCK 2,524,209

TELEPHONE INDEX DEVICE

Filed Sept. 30, 1947 5 Sheets-Sheet 1

INVENTOR
MARTIN S. POLLOCK,
BY
Irving Seidman
ATTORNEY

Oct. 3, 1950

M. S. POLLOCK 2,524,209

TELEPHONE INDEX DEVICE

Filed Sept. 30, 1947

5 Sheets-Sheet 2

INVENTOR
MARTIN S. POLLOCK,
BY
Irving Seidman
ATTORNEY

INVENTOR
MARTIN S. POLLOCK,
BY Irving Seidman
ATTORNEY

Oct. 3, 1950 M. S. POLLOCK 2,524,209

TELEPHONE INDEX DEVICE

Filed Sept. 30, 1947 5 Sheets-Sheet 4

INVENTOR
MARTIN S. POLLOCK,
BY
Irving Seidman
ATTORNEY

Oct. 3, 1950 M. S. POLLOCK 2,524,209
TELEPHONE INDEX DEVICE
Filed Sept. 30, 1947 5 Sheets-Sheet 5

INVENTOR
MARTIN S. POLLOCK,
BY
Irving Seidman
ATTORNEY

Patented Oct. 3, 1950

2,524,209

UNITED STATES PATENT OFFICE 2,524,209

TELEPHONE INDEX DEVICE

Martin S. Pollock, New York, N. Y.

Application September 30, 1947, Serial No. 776,910

4 Claims. (Cl. 40—104)

The invention relates to a desk accessory for listing telephone numbers upon indexed cards and has particular reference to a device of the said character comprising a lower card holding base member to which there is pivotally attached, at one end thereof, an upper card holding member adapted to swing around its pivotal connection with the said lower member to expose the cards therein, a spring actuating means being employed to swing the said upper card holding member to its open position and a spring latch to hold the said upper card holding member in closed position. Means are also provided to select a particular card and expose same to view when the said upper card holding member swings open.

An object of this invention is the provision in same of a card holding mechanism which will permit recordings upon both sides of the said cards, a feature which is not feasible in devices of this type at present in use.

Another object of this invention is the provision therein of spring actuating means to swing the said upper card holding member about its pivotal connection when the said spring latch is released.

A further object of this invention is the inclusion therein of stop means to hold the said upper card holding member in vertical, open position, at right angles to the base, and means to release the said upper card holding member to allow same to continue its movement to a horizontal position in line with the said base.

A still further object of this invention is the inclusion therein of a manually operated means whereby a particular card may be exposed to view when the said upper card holding member is raised or turned about its said pivotal connection.

Another object of this invention is the provision therein of means for maintaining the said upper card holding member in a vertical upright position against the pressure of a spring actuated opening means and allowing the said upper card holding member to be manually pressed downwardly against the said spring actuated opening means to assume a horizontal position thereby exposing the front side of one index card and the reverse side of another.

Another object of this invention is this inclusion therein of a spring actuating means for locking the upper card holding member in either its vertical or horizontal position, the said locking means being manually operable to release said closure member from the said vertical or horizontal position.

Another object of this invention is the provision therein of the barrel shaped card attaching means for holding slotted cards, giving the cards free circular movement and permitting their easy attachment to the device.

A still further object of this invention is the inclusion therein of cards having cut-out slotted end sections which are adapted to engage the said barrel shaped card holding means.

A still further object of this invention is the provision therein of a drawer attachment for containing loose sheets for memorandum purposes.

A further object of this invention is the provision therein of a pencil holding pocket formed within the said drawer and provided with cut-out portions in the side walls of same to facilitate the removal of the pencil in the pocket.

A still further object of this invention is the provision of a device in which the constituent elements are so arranged structurally and functionally as to assure improved results with materials and members which may be manufactured at reasonable cost, may be easily assembled and which will be efficient in operation with minimum wear to the parts.

The invention possesses other objects and features of advantage, some of which, with the foregoing will be set forth in the following description and in the claims wherein parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figures 1, 2, 3:
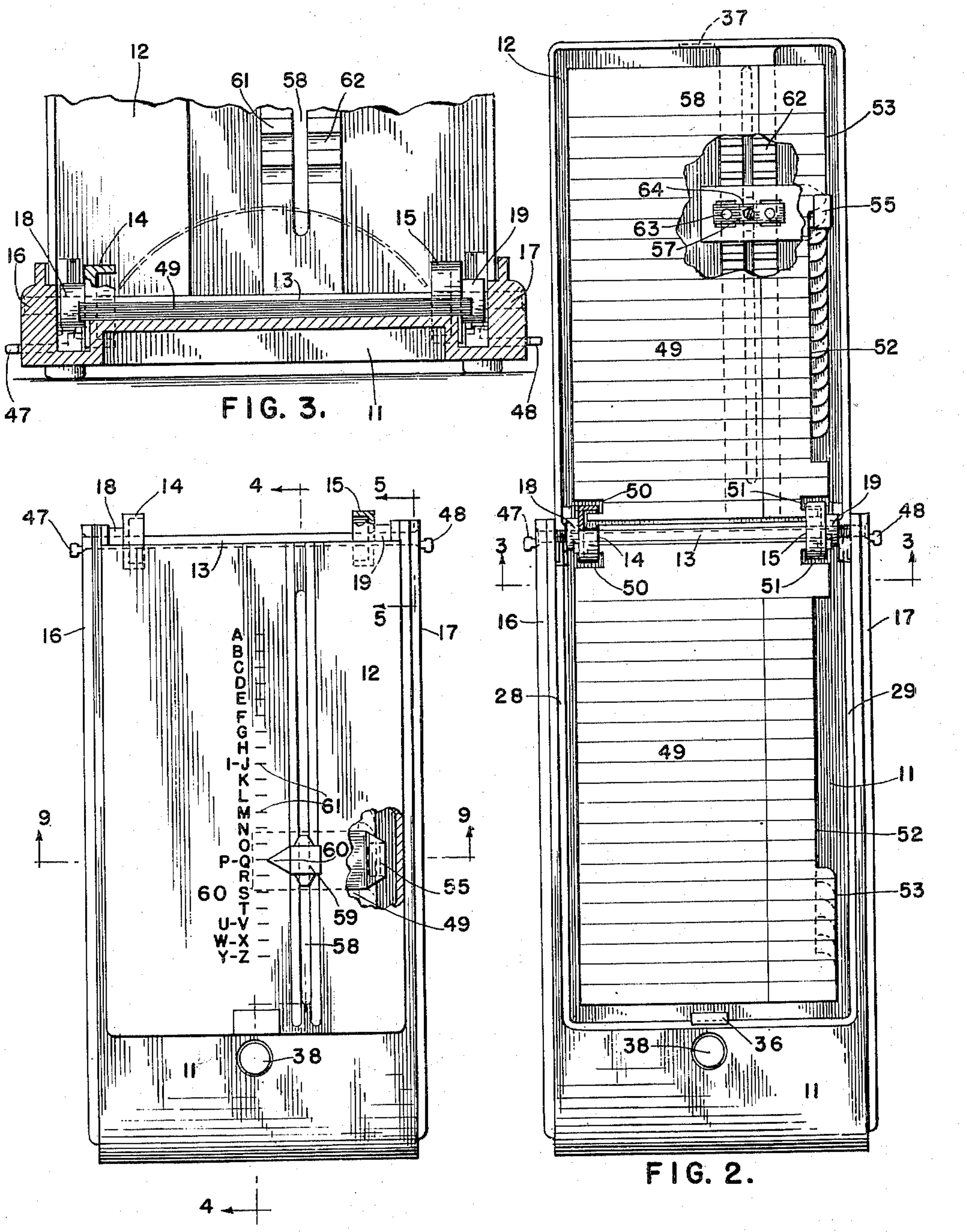
Figure 1 is a top view of the device shown closed.
Figure 2 is a plan view showing the device fully open.
Figure 3 is an enlarged transverse section taken along the line 3—3 of Figure 2, but showing a part of the cover in half open position.
Figure 8:
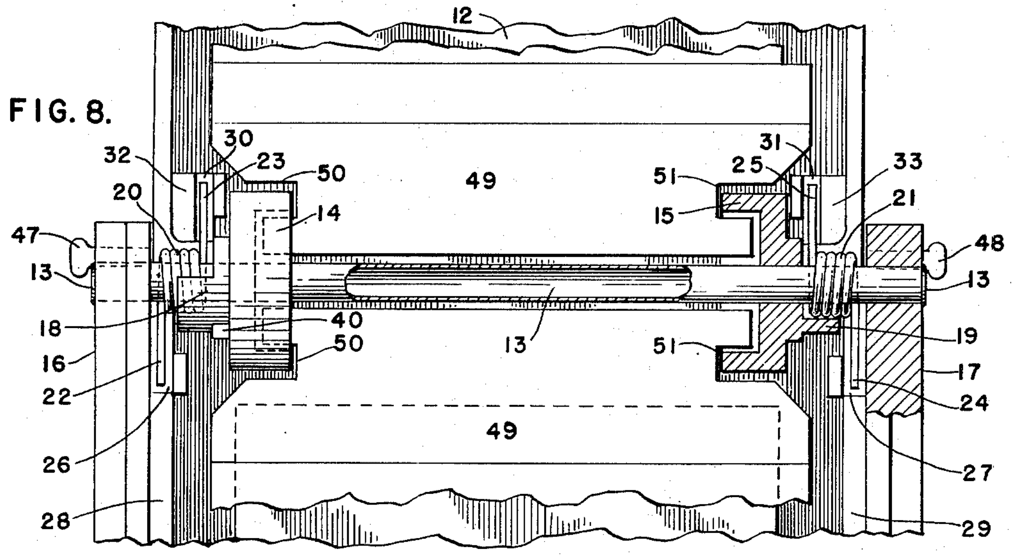
Figure 8 is a fragmentary plan view showing a pivotal connecting means or hinge and slotted cards in position upon the device.
Figure 9:
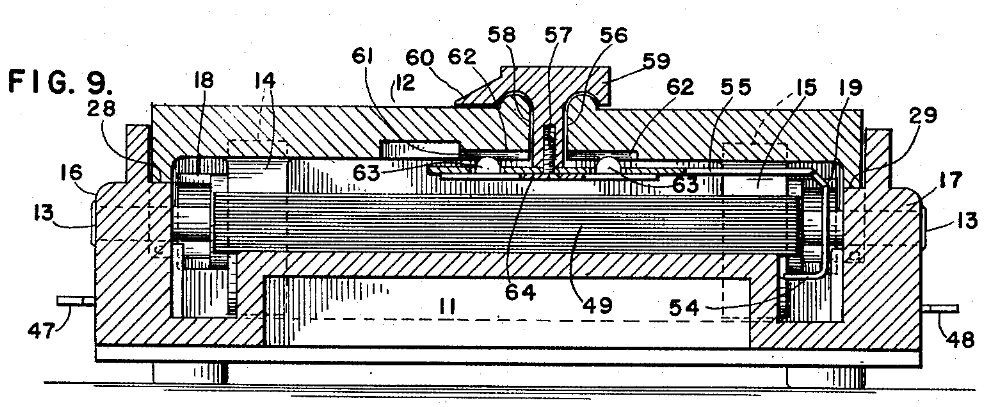
Figure 9 is an enlarged sectional view taken along line 9—9 of Figure 1 and looking in the direction indicated by the arrows.
Figure 10:
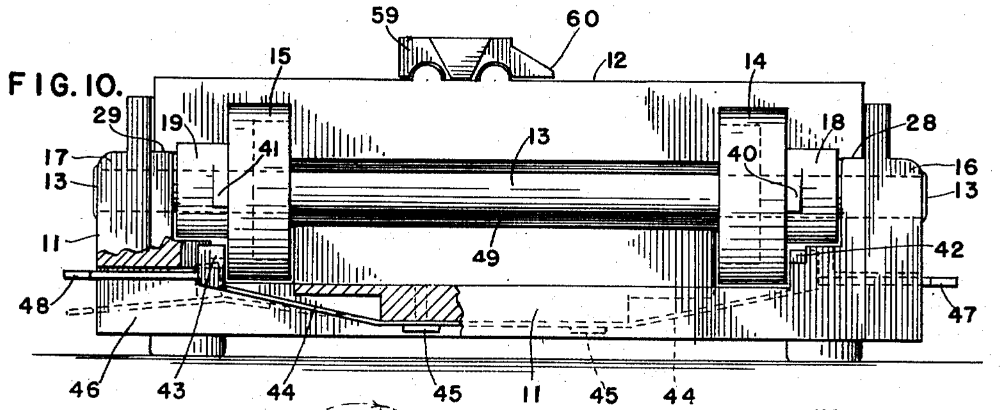
Figure 10 is a rear elevational view of the device with portions broken away.

Referring in detail to the parts, 11 designates the lower portion of a casing and card holding member, 12 is the upper portion of the casing or upper card holding and closure member which is hinged to the said lower portion 11 by means of a tubular pin 13 extending through barrel formations 14 and 15 integrally formed upon the said upper card holding member. The said pin 13 is securely attached to the side walls 16 and 17 of the lower card holding member. Concentric with and extending laterally from the said barrel formations 14 and 15 respectively, are semi-cylindrical pockets 18 and 19 which are integrally formed thereon and within which there are housed spiral spring elements 20 and 21. The said springs engage around or encircle the tubular pin 13 which is secured at its ends to the said side walls 16 and 18. The spiral spring 20 is formed with extended arms 22 and 23 which normally assume the straight line position when faced as shown by the full lines in Figure 11. The spiral spring 21 is similarly formed but has its extended arms 24 and 25 arranged in reverse position to the extended arms of spiral spring 20 as shown in Figures 2 and 8.

Figure 4:
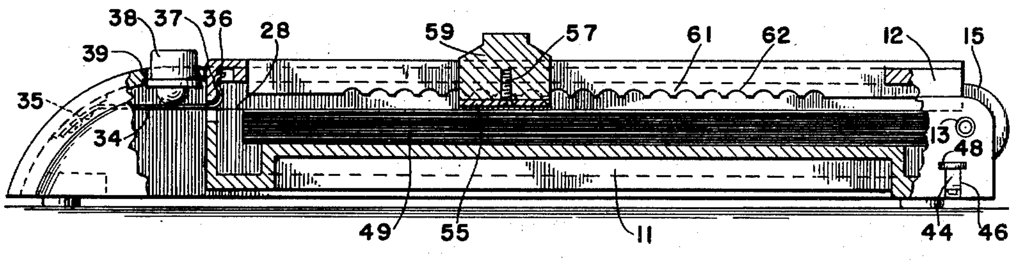
Figure 4 is an enlarged longitudinal section substantially along line 4—4 of Figure 1.
Figure 5:
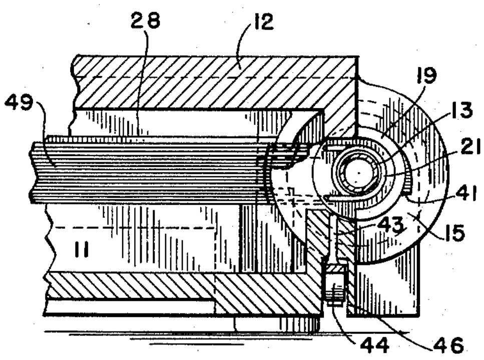
Figure 5 is an enlarged fragmentary view, in section, of the hinge portion and is taken along the line 5—5 of Figure 1 looking in the direction indicated by the arrows and shows the parts in closed position.

The said extending arms 22 and 24 of the springs 20 and 21 respectively, engage in depressed slots 26 and 27 formed at the ends of the ledges 28 and 29 upon the side walls 16 and 17, respectively, of the lower card holding member 11 and the said extending arms 23 and 25 of the springs 20 and 21 respectively engage in slots 30 and 31 upon blocks 32 and 33 respectively which are integrally formed upon the upper card holding member 12. The said upper member 12 is adapted to semi-circular rotation about its pivotal connecting pin 13 and may be moved from the horizontal open position shown in Figures 2, 7, 8 and 9 against the pressure of the springs 20 and 21, to the closed position shown in Figure 4.

Figure 6:
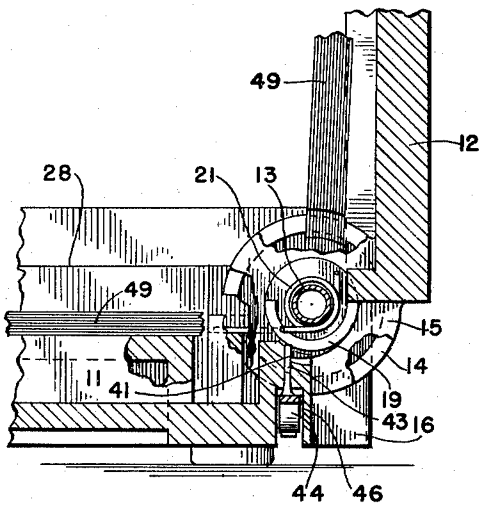
Figure 6 is a similar fragmentary sectional view but shows the cover member in an upright vertical or half open position.
Figure 7:
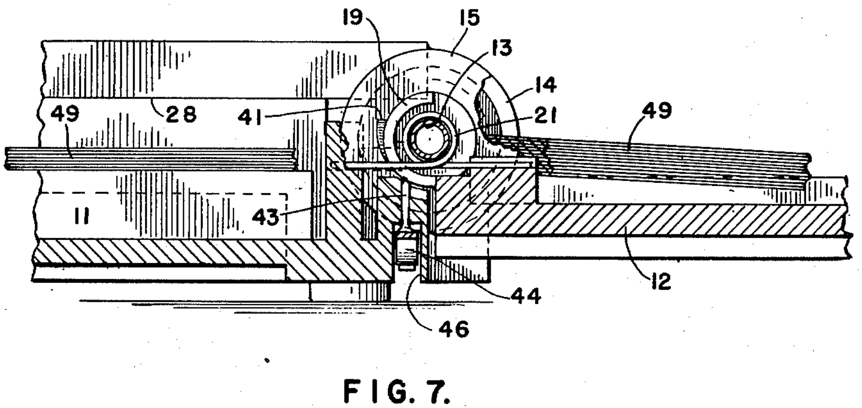
Figure 7 is a similar fragmentary sectional view but shows the cover member extended to full open position.

A spring catch 34 is secured to the lower card holding member 11 at 35 and is formed with a hook end 36 which engages a groove 37 upon the upper card holding and closure member 12 and is adapted to hold the said member 12 in closed position as shown. A button 38, movable through a perforation 39 in the upper card holding member and contacting the said spring 34, is employed to depress the said spring and release the upper card holding member allowing it to rise to the vertical open position shown in Figures 3 and 6 or when released from its vertical position to continue to a horizontal open position as shown in Figures 2 and 7.

Upon the outer periphery of the semi-cylindrical pockets 18 and 19 respectively, there are provided lugs 40 and 41 which are adapted to engage stops 42 and 43 formed upon the ends of a flat spring 44, attached to the lower card holding member 11 by means of screws 45 and which extend laterally through slots 46. The said stops 42 and 43 coacting with the lugs 40 and 41 afford a means whereby the said upper card holding member 12 is stopped, in its opening movement, when it reaches a vertical position. The said uper card holding member may be held in such position until released by a finger pressure upon the extending arms 47 and 48 upon each end of the said spring 44, whereupon the pressure of the spiral springs 20 and 21 will further move or rotate the said upper card holding member and bring it to its lower horizontal and fully open position.

Cards 49, which may be suitably lined, are formed at one end with slots 50 and 51 by means of which the cards are removably attached to the aforesaid barrel formations 14 and 15 respectively. The said cards being flexed or sprung into place as indicated by the dot-dash lines shown in Figure 3. One side edge of the cards 49 are formed with cut-out sections 52 and projecting portions 53 which are adapted to coact with the turned end 54 of a selector element 55. The said selector element 55 is secured to a block 56 by means of a screw 57 and the block 56 is movable in a slot 58 upon the said upper card holding member 12 and is held thereon by the overlapping T-shaped head 59 formed upon the upper portion of the said block 56. A pointer 60 may be formed upon the head 59 and is adapted to aline with suitable markings 61 upon the top of the said closure member 12. The said markings are in turn suitably marked with letters of the alphabet and indicate the position for setting the pointer to bring the selector 55 into proper alinement with the corresponding projecting portion of the card. When the pointer is thus properly positioned, the button 38 may be depressed to release the said upper card holding and closure member 12 which then moves upwardly to its vertical position carrying with it all of the cards up to the one carrying an index letter corresponding to the letter alined with the pointer 60.

Upon the under side of the said upper card holding and closure member 12, adjacent to the slot 58, there are formed ridges 61 having notches 62 with which heads 63 are adapted to engage to hold the selector 55 against accidental displacement. The said heads 63 are held upon the selector 55 by a flat spring element 64 (Figure 9) which is secured in place by the screw 57.

Figure 11:
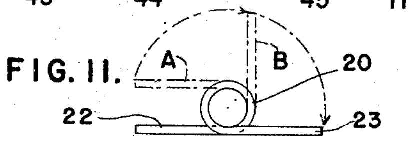
Figure 11 is a detail of one type of spring used in the pivotal connecting means.

The spiral springs 20 and 21, when free, are normally open as indicated in Figure 11, which shows the spring 20. The extending arms 22 and 23 of the spring shown lie in a straight line. When, however, the upper card holding and closure member 12 is held down in closed position, by the latch 36, the arm 23 which engages against the said card holding closure member 12 is pulled against the pressure of the spring, to the position indicated by the dot-dash lines A. When the card holding closure member 12 is released the spring pressure moves same upwardly to its upright position, the lugs 40 and 41 coacting with the stops 42 and 43 arrest the movement of the said upper card holding member and hold same in its upright position. The extending arm 23 then assumes the position indicated at B. When the stops 42 and 43 are depressed the upper card holding and closure member is released and the spring pressure forces same downwardly to its fully open horizontal position whereupon the arm 23 assumes the position shown by the full lines.

In Figures 15 to 20 inclusive, a modified form of spring action is shown, wherein spiral springs 70 having extending arms 71 and 72 normally positioned at right angles to one another, are used, and the lugs 40 and 41 of the form heretofore described are omitted. The arm 71 engages in a groove 73 in a block 74 integrally formed upon the said lower card holding member 11 and the arm 72 engages a groove 75 in a block 76 integrally formed upon the said upper card holding member 12.

When the latch 36 releases the upper card holding and closure member 12 the action of the spring arm 72 due to the pressure between it and the spring arm 71, will force the upper card holding member to its vertical position where it will be held by means of the stop 42 engaging in the indentation 77 upon the semi-cylindrical pocket 18. A slight hand pressure upon the card holding and closure member will release same and allow its downward movement to full open position at which point projecting lugs 78 upon each side will engage over the stop 42 and lock the upper card holding member against any return movement. By depressing the finger holds 47 and 48 the lugs 78 are released and the spring pressure forces the upper card holding and closure member to its upright vertical position. When the said upper card holding and closure member is held closed by the latch 36 the spring arm 72 will assume the position shown by the dot-dash lines C in Figure 20 and will exert a pressure toward the vertical position shown by the full lines. When the upper card holding and closure member is fully open and locked in such position, the spring arm 72 will assume the position indicated at D and exert a pressure toward the normal position of the said spring, and will force the card holding and closure member back to its vertical position when the stop 42 releases the lugs 78.

Figure 12:
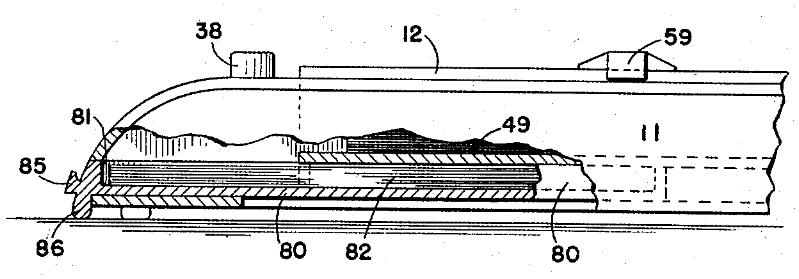
Figure 12 is a side elevational view of the front end of the device partly broken away to show the detail of a modified form.
Figure 13:
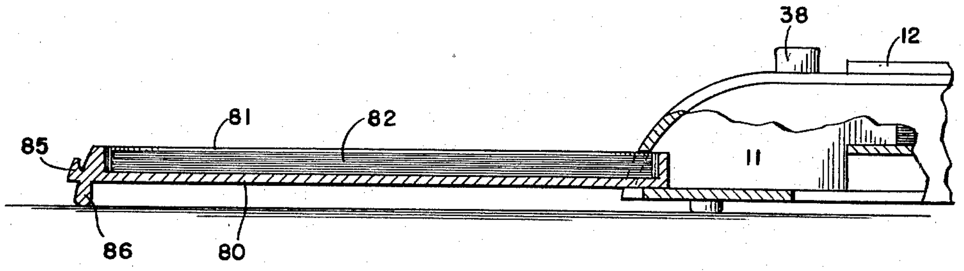
Figure 13 is a similar side view showing a drawer portion pulled out into open position.
Figure 14:
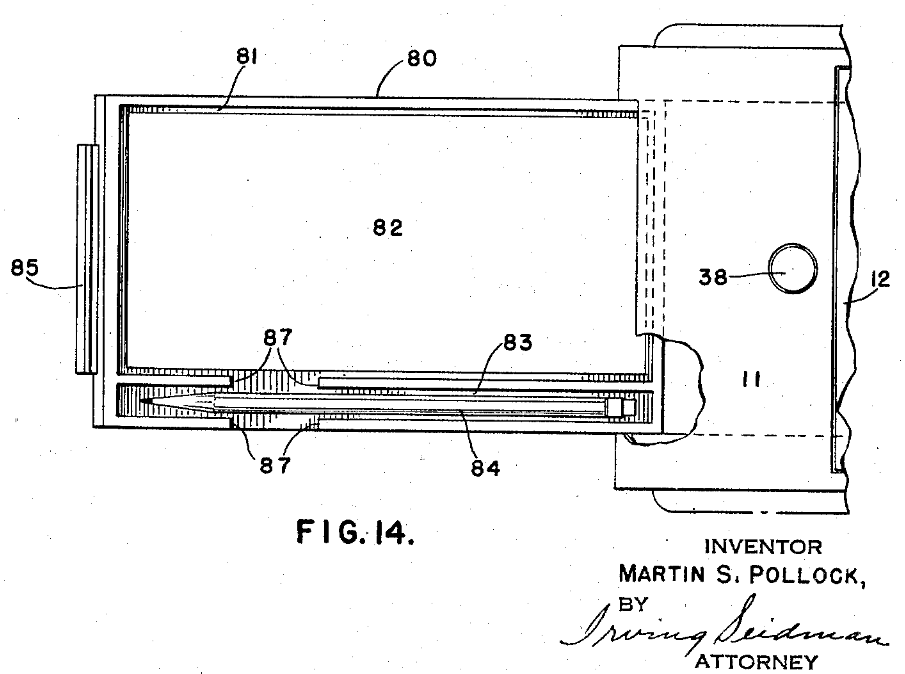
Figure 14 is a plan view showing the drawer pulled out.
Figures 15, 16, 17, 18, 19, 20:
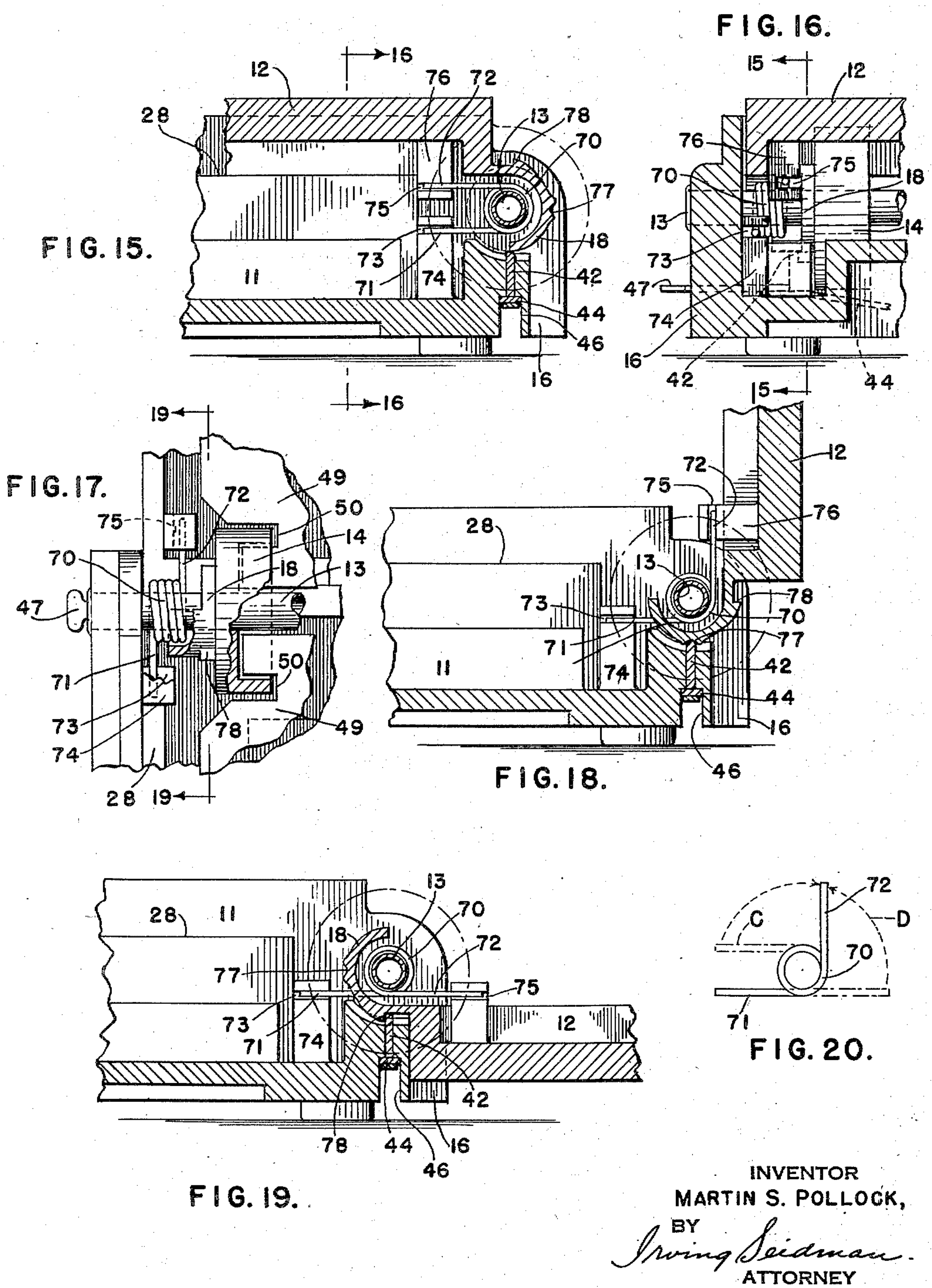
Figure 15 is a fragmentary sectional view similar to that of Figure 5 but showing a minor modification.
Figure 16 is a sectional detail substantially along the line 16—16 of Figure 15.
Figure 17 is a fragmentary plan showing a detail of the hinge when the device embracing the modification is fully open.
Figure 18 is an enlarged fragmentary section similar to Figure 6 but showing the modified form of Figure 15.
Figure 19 is an enlarged fragmentary sectional view similar to Figure 7 but showing the modified form shown in Figure 15.
Figure 20 is a detail view of a spring used in the modified form.

In Figures 12 to 13 inclusive there is shown a sliding tray or drawer 80 which is formed with a compartment 81 for holding loose memoranda slips 82. The drawer is also formed with a second compartment 83 for holding a pencil or pen 84. A handle 85 may be provided upon the front of the said drawer and a depending foot member 86 may be formed thereon at the front of the drawer. The side walls of the pencil compartment 83 may be cut out as at 87 to afford finger access to readily pick up the pencil.

It will be noted that when the device is fully opened (see Figure 2), both sides of the cards may be inscribed with names and telephone numbers thus doubling the capacity for recording over those of a similar type now in use.

I claim:

1. In a device for recording indexed memoranda, a lower card holding and closure member, an upper card holding member engaging over the said lower card holding member and pivotally attached at one end thereto, a manually actuated spring latch engaging and holding the said upper card holding and closure member upon said lower card holding member, spring means at the pivotal connection engaging between the said lower card holding and closure member and upper card holding member and adapted to force the said upper card holding and closure member to open position when the said latch releases same, recording cards detachably held at the pivotal connection and adapted to semi-circular rotation about same, adjustable means upon the said upper card holding and closure member adapted to lift one or more cards with same when same rotates about its pivotal connection, means for stopping and holding said upper card holding and closure member in its half open position, approximating 90 degrees, and means for releasing said member from its half open position and allowing same when so released, to continue in its rotation to its full open position approximating 180 degrees.

2. The device for recording indexed memoranda as set forth in claim 1, wherein spring actuating means are provided to normally hold the said upper card holding and closure member in half open position.

3. A device for recording indexed memoranda, comprising upper and lower card holding members pivotally attached at one end, indexed cards detachably mounted at one end within the said card holding members, spring actuating means at the pivotal end of the said card holding members and adapted to swing the upper card holding member about its pivot connection in a semi-circular arc, spring actuated stop means upon the lower card holding member adapted to engage the said upper card holding member to stop and hold same in position at a right angle to the said lower card holding member, manually operable means for releasing the said upper card holding member to allow same to continue its arcuate movement to a position forming a straight angle with said lower card holding member, a spring latch upon the said lower card holding member adapted to engage the said upper card holding member to lock the said card holding members in closed position, indexed memoranda cards having cut-out and projecting portions upon one side thereof, detachably mounted upon the said upper card holding member and adapted to move with the said upper card holding member, selector means slideable upon the said upper card holding member, and adapted to engage with the projecting portions of said indexed memoranda cards to hold one or more of the said cards to the said upper card holding member and indicia upon the said upper card holding member to indicate the position of the said selector relatively with the cut-out and projecting portions of the said indexed cards.

4. The device for recording indexed memoranda as set forth in claim 3, wherein the actuating means for forcing the said upper and lower card holding members apart comprises a spiral spring having right angularly extending arms which are adapted to raise the said upper card holding member from its closed position to a right angular position and also adapted to raise same from a horizontal open position to its right angular position and means for locking and holding the said upper card holding member in its horizontal open position.

MARTIN S. POLLOCK.

REFERENCES CITED

The following references are of record in the file of this patent:

UNITED STATES PATENTS

| Number | Name | Date |
|---|---|---|
| 727,148 | Jones | May 5, 1903 |